June 29, 1971 R. S. NELSON 3,589,949

SEMICONDUCTORS AND METHODS OF DOPING SEMICONDUCTORS

Filed Aug. 18, 1969 4 Sheets-Sheet 2

June 29, 1971 R. S. NELSON 3,589,949

SEMICONDUCTORS AND METHODS OF DOPING SEMICONDUCTORS

Filed Aug. 18, 1969 4 Sheets-Sheet 3

SEMICONDUCTORS AND METHODS OF DOPING SEMICONDUCTORS

Filed Aug. 18, 1969 4 Sheets-Sheet 4

3,589,949
SEMICONDUCTORS AND METHODS OF DOPING SEMICONDUCTORS

Richard Stuart Nelson, Goring-on-Thames, England, assignor to United Kingdom Atomic Energy Authority, London, England Filed Aug. 18, 1969, Ser. No. 850,718
Claims priority, application Great Britain, Aug. 22, 1968, 40,308/68
Int. Cl. H01l 7/54
U.S. Cl. 148—1.5 9 Claims

ABSTRACT OF THE DISCLOSURE

A region of semiconductor material is doped by bombarding the region with dopant ions, additionally bombarding the region with non-dopant ions, and annealing the region. The additional bombardment, especially if sufficient to form the region into an amorphous condition, which is recrystallised by the anneal, improves the absorption of the dopant ions into active substitutional sites in the lattice.

BACKGROUND OF THE INVENTION

The invention relates to semiconductors and methods of doping semiconductors.

To form regions of semiconductor with controlled electrical activity, for example, the p and n-type regions, dopant atoms are introduced into the semiconductor material. The dopant atoms are only effective when they adopt atomic sites in the crystal lattice in substitution for the host atoms.

The implantation of dopant ions into a semiconductor by bombarding the semiconductor with the ions provides for good control of the depth of penetration of the ions and the number of ions introduced into a specified region of the semiconductor.

The ion bombardment causes damage to the crystal lattice and, except for certain implantations carried out at elevated target temperatures, subsequent moderate temperature annealing treatments (for example 630° C. for silicon) are necessary for removing or reducing the radiation damage effects and to cause implanted atoms to take up substitutional lattice positions.

With certain implantations, the radiation damage is sufficiently extensive to form a substantially amorphous surface region in the semiconductor material. However, with other implantations notably boron implanted into silicon, the radiation damage for the normally required doses is much less.

SUMMARY OF THE INVENTION

The present invention is based on the appreciation that the greater the radiation damage, the greater is the chance, on annealing, for the implanted ion to adopt substitutional lattice positions and thus become effective to modify the electrical activiy of the semiconductor. The useful limit of radiation damage is that which will produce a substantially amorphous phase throughout the region which it is desired to dope.

The invention provides a method of doping a region of semiconductor material comprising bombarding the region to a predetermined extent with ions of the dopant, and additionally bombarding the region with non-dopant ions, the bombardment being accompanied or succeeded by heating to anneal the region.

Preferably the dose and energy of the non-dopant ions is selected such as, in combination with the dopant ion bombardment, to be effective in the absence of any anneal to form a substantially amorphous phase in the semiconductor surface region penetrated by the ions, whereby, on annealing to permit recrystallisation of the amorphous surface region, conditions are particularly favourable for dopant ions to adopt substitutional sites in the crystal lattice.

Preferably the dose and energy of the non-dopant ions is such that the amorphous surface region formed is of sufficient extent to contain entirely the implanted dopant ions.

DESCRIPTION OF PREFERRED EMBODIMENT

The analysis on which the present invention is based and a specific example of method embodying the invention will now be described with reference to the accompanying drawings in which are graphical representations of various characteristics of various doped semiconductor samples.

Figure 1:
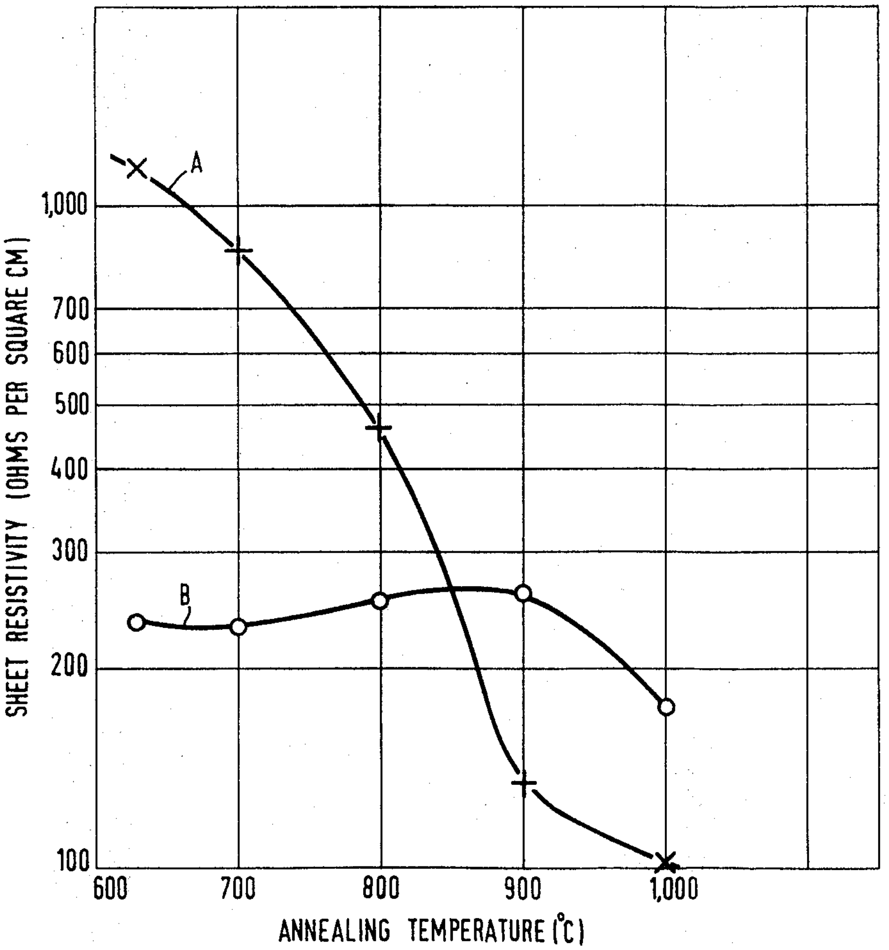

In FIG. 1, sheet resistivity, which is a (inverse) measure of the number of donor atoms per sq. cm., is plotted as a function of isochronal annealing temperature. The curve A is for silicon ion implanted with boron at a dose of $10^{15}$ ions /sq. cms. and an energy of 40 kev. The curve A shows that a very low fraction of implanted atoms become electrically active unless very high annealing temperatures (of the order of 1000°) are employed. After a 630° C. anneal only about 7 percent of the total implanted atoms are electrically active. This is in sharp contrast with the results in comparable phosphorus implants where nearly 100 percent activity results after a similar heat treatment.

Figure 2:
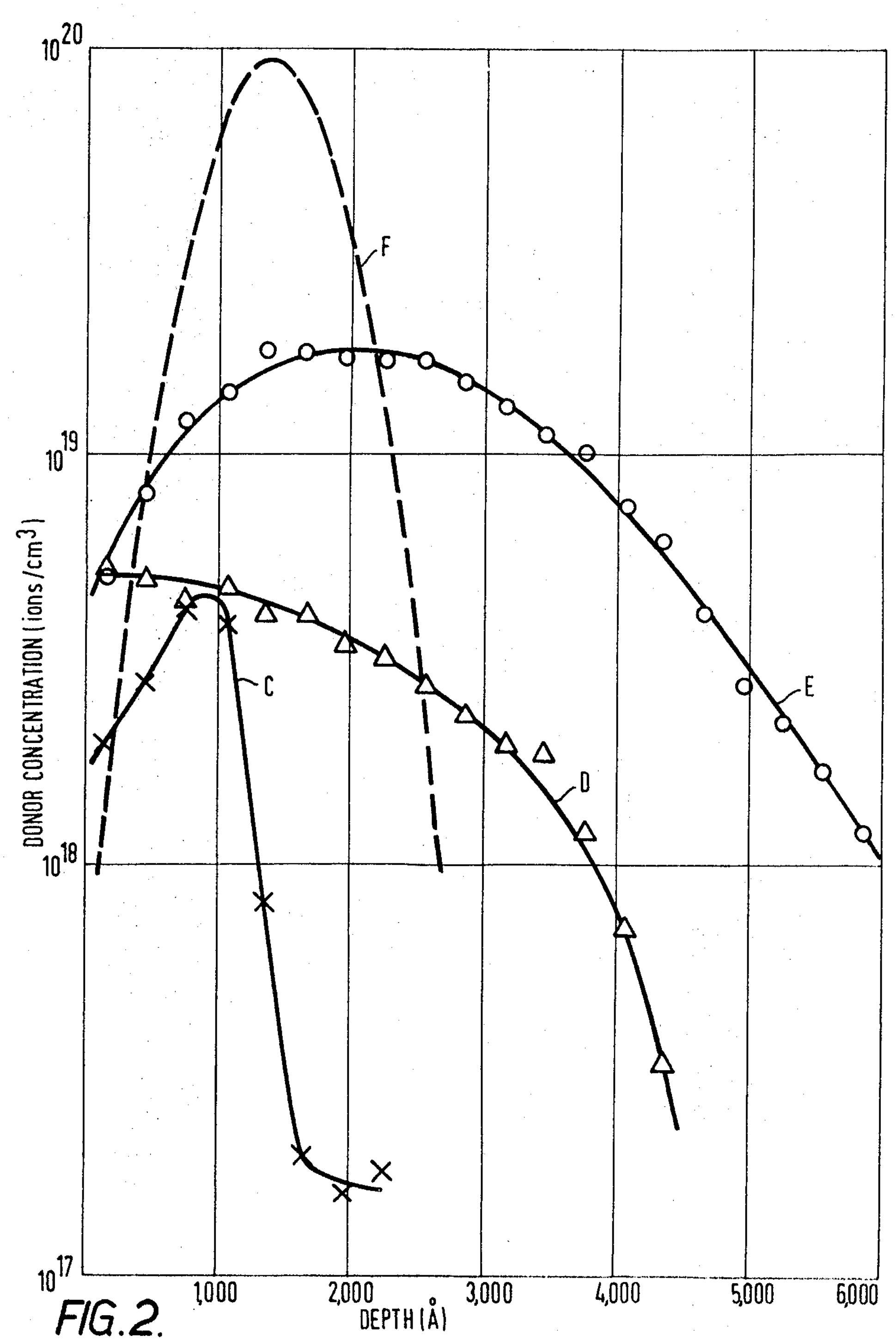

Profiles (that is curves representing the variation of density with depth in the seimconductor material) of electrically active implanted boron have been measured as a function of annealing temperature by combining sheet resistivity measurements with an anodic oxidation and stripping technique. Using the mobility data published by Irvin in the Bell System Technical Journal No. XL1, 387, (1962), the results are shown in FIG. 2 in which donor concentration in ions per cu. cm. is plotted against depth in angstrom units. The curves referenced C, D and E respectively are the profiles of boron ion implanted into silicon and annealed at 600° C., 800° C. and 1000° C. The dashed curve F represents the theoretically expected profile according to Lindhard and Scharff (Physics Review 124, 128 (1961)).

For the highest temperatures of annealing, where much increased activity results, significant broadening of the profile by thermal diffusion occurs (curve E). For this reason, and also because the carrier life-time in the bulk material is degraded, such high temperature anneals are undesirable. Two potential advantages of ion implantation, namely sharp profiles and low temperature processing, have not therefore been realised in practice with these boron implants.

Whether or not an implanted impurity readily takes up a substitutional site is likely to depend in a complex manner on a number of factors such as the mass and size of the dopant ion, the structure of the substrate and the effects of other impurities. It has been appreciated, however, that lattice defects produced during implantation are likely to play a vital role.

Radiation damage produced in silicon during implantations carried out near room temperature, takes the form of small highly disordered zones about 100 angstrom units in diameter. As the dose builds up, the zones may eventually overlap to form a continuous essentially amorphous surface phase to a depth approximately equal to the range of the bombarding ions. This amorphous surface layer may be recrystallised epitaxially onto the underlying single crystal matrix by thermal annealing at a temperature of 630° C. A small number of dislocation loops and dipoles are formed on recrystallisation, but these do not appear to have a significant influence on electrical characteristics. At these moderate temperatures little substitutional thermal diffusion can occur and the implanted profiles should approximate to those expected on theoretical grounds.

It has been shown that a dose of $10^{15}$ phosphorus ions per sq. cm. is more than adequate to create a complete amorphous layer on silicon, whereas it requires a dose of between $10^{16}$ and $10^{17}$ boron ions per sq. cm. to produce a similar effect at the same energy. This is a consequence of the lighter mass of boron, where firstly the scattering cross-section is some five times smaller, and secondly a significantly larger fraction of the incident ion energy is dissipated by electronic excitation rather than by nuclear collisions with target atoms.

It has thus been appreciated that for the usual doses employed in ion implantation ($10^{13}$–$10^{15}$ ions per sq. cm.) there is therefore a fundamental difference in the structure of implanted layers of phosphorus and boron respectively. The phosphorus is contained almost entirely within a completely amorphous surface layer. The boron atoms on the other hand reside mostly in essentially crystalline surface silicon with only a small proportion in disordered zones.

On annealing, it has been anticipated that, because the amorphous zones or layers have to be completely rearranged, there is a strong possibility that dopant ions residing in these regions are able to take up favourable substitutional sites. This is consistent with experimental data because for phosphorus, where high electrical activity results, the complete surface has to be reformed, whereas for boron only those atoms residing in disordered zones have a good chance of becoming active. The remaining boron can be made to assume substitutional positions only by supplying excess vacancies by, for example, thermal generation.

In the specific example of the method embodying the invention now to be described, increased electrical activity of boron implants is obtained by deliberately forming a completely amorphous surface layer by bombarding the silicon with non-dopant ions in addition to the boron implantation. The non-dopant ions may comprise one of the inert gases or even silicon itself and this bombardment may be carried out either before or after the boron implantation. The use of ions of the same element as the substrate, i.e. in this case the use of silicon ions, for the additional non-dopant ion bombardment, is desirable, because there is then no possible problem of impurity effects introduced by the non-dopant ion. In practice, however, it may be more convenient to produce ions of one of the inert gases.

Figure 3:
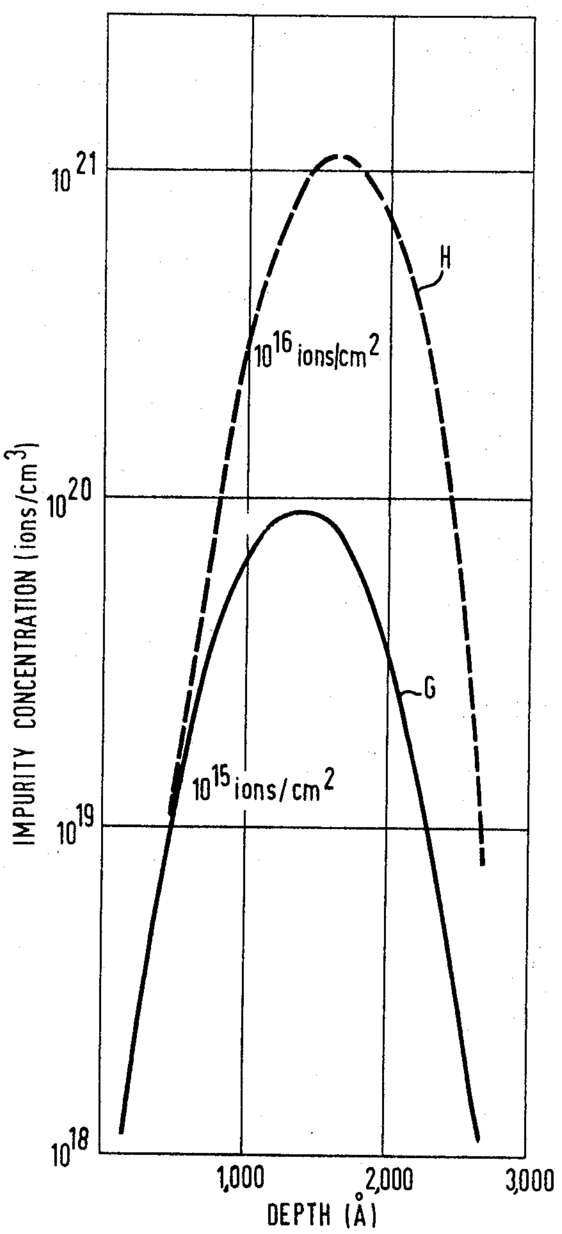

In this example, a substrate of silicon was bombarded with a dose of $10^{15}$ ions per sq. cm. of boron at an energy of 40 kev. This bombardment was followed with a bombardment by neon ions to a dose of $10^{16}$ ions per sq. cm. at an energy of 80 kev. FIG. 3 shows the theoretical profiles to be expected from these bombardments, the curve G being for the implanted boron and the curve H being for the neon. FIG. 3 indicates that the implanted boron will be completely within the layer damaged by the neon ions. It will be appreciated that for optimum results, the dose and energy of the non-dopant ion bombardment should be chosen so that the dopant ion is entirely contained within the amorphous layer in this way. Further, for securing a precisely controlled profile, it would appear desirable for the depth of damage by the non-dopant ions not to exceed very much the depth of penetration of the dopant ions.

Curve B in FIG. 1 shows the improved electrical activity achieved with the double bombardment of the method of this example. For a 630° C. anneal (needed to recrystallise the amorphous layer) the sheet resistivity is improved by a factor of about 5 over the value obtained with the boron implant alone (curve A).

Figure 4:
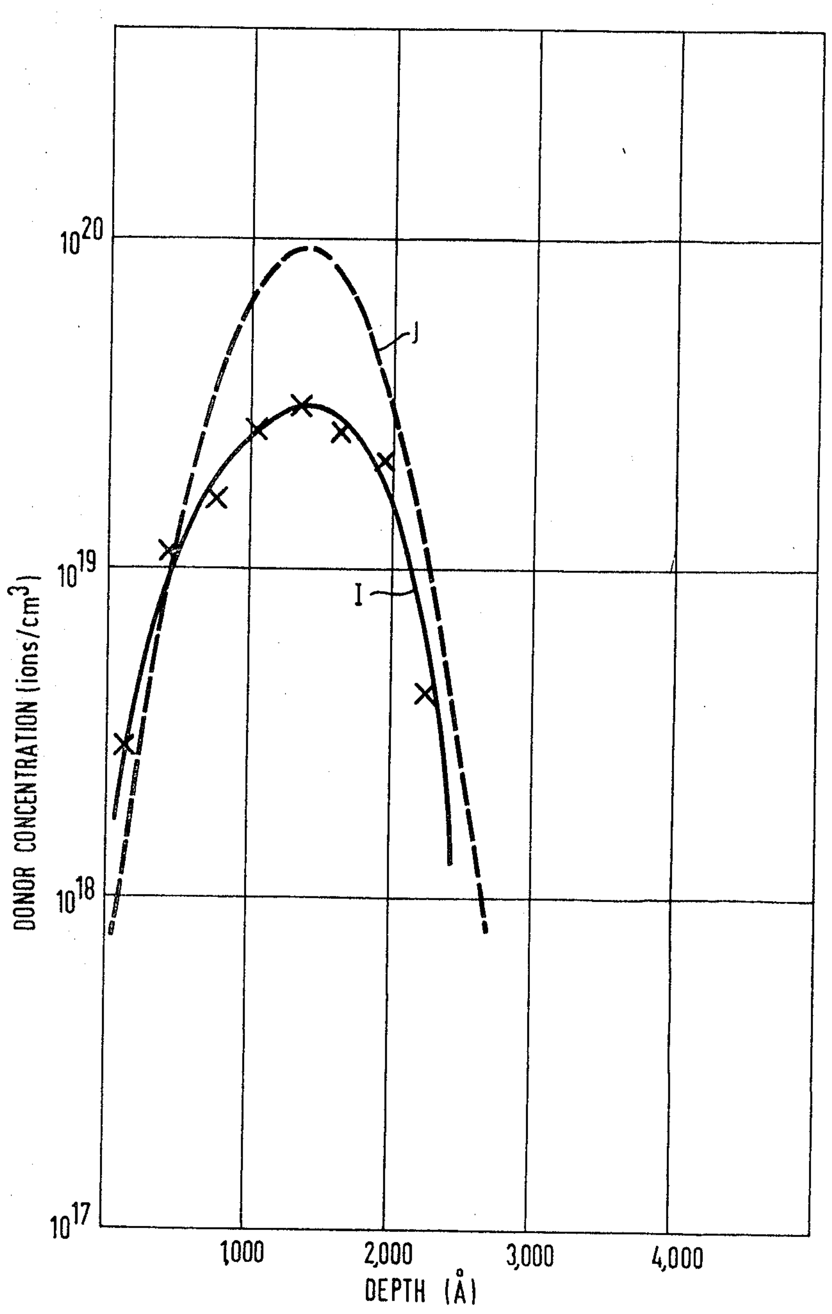

The profile of electrical activity of the semiconductor device produced by the method of this example after annealing for 85 minutes at 630° C. is shown as curve I in FIG. 4. The dashed curve J is the theoretically expected boron ion distribution. As may be seen from FIG. 4, the profile obtained in practice is quite close to the theoretically predicted profile.

The invention is not restricted to the details of the foregoing example. For instance, the bombardment with non-dopant ions need not necessarily be carried out after the implantation with dopant ions but may, for example, be carried out before the dopant implantation. This reversed procedure could be advantageous in suppressing tails in the dopant profile due to channelling. This consideration was not important in the above-described example, because the silicon substrates were orientated so as to minimise channelling. Further, under certain circumstances it may be possible to carry out the bombardment with dopant and non-dopant ions simultaneously.

I claim:

1. A method of doping a region of semiconductor material comprising bombarding the region to a predetermined extent with ions of the dopant, and additionally bombarding the region with non-dopant ions, the bombardment being succeeded by heating to anneal the region.

2. A method as claimed in claim 1, wherein the bombardment with non-dopant ions is maintained at an energy and at the selected dose rate sufficiently to form a substantially amorphous phase in the semiconductor surface region penetrated by the ions.

3. A method as claimed in claim 2, wherein the bombardment with non-dopant ions is maintained at an energy and at the selected dose rate sufficiently to form into an amorphous surface region the entire region containing the implanted dopant ions.

4. A method of doping a region of semiconductor material comprising bombarding the region to a predetermined extent with ions of the dopant, and additionally bombarding the region with non-dopant ions, the bombardment being accompanied by heating to anneal the region.

5. A method as claimed in claim 4, wherein the bombardment with non-dopant ions is maintained at an energy and at the selected dose rate sufficiently to form a substantially amorphous phase in the semiconductor surface region penetrated by the ions.

6. A method as claimed in claim 5, wherein the bombardment with non-dopant ions is maintained at an energy and at the selected dose rate sufficiently to form into an amorphous surface region the entire region containing the implanted dopant ions.

7. A semiconductor material having a doped region wherein the concentration of dopant ions in active substitutional sites in the lattice has been increased by the method as claimed in claim 1.

8. A semiconductor material as claimed in claim 7, wherein the material is silicon.

9. A semiconductor material as claimed in claim 8, wherein the dopant ions are boron ions.

References Cited

UNITED STATES PATENTS 3,413,531 11/1968 Leith ............... 148—1.5

L. DEWAYNE RUTLEDGE, Primary Examiner

R. A. LESTER, Assistant Examiner

U.S. Cl. X.R.

29—576; 148—186